United States Patent [19]
Hansen

[11] 3,887,282
[45] June 3, 1975

[54] CONCAVE CONIC REFLECTOR

[75] Inventor: Howard C. Hansen, Battle Creek, Mich.

[73] Assignee: Clark Equipment Company, Buchanan, Mich.

[22] Filed: Feb. 22, 1974

[21] Appl. No.: 446,195

[52] U.S. Cl. ............... 356/138; 356/172; 350/27; 350/296
[51] Int. Cl. .............................................. G01b 11/26
[58] Field of Search .......... 350/296, 27, 21; 33/288; 356/138, 172

[56] References Cited
UNITED STATES PATENTS

| | | |
|---|---|---|
| 2,493,430 | 1/1950 | Ward .................................. 350/296 |
| 2,686,866 | 8/1954 | Williams ............................. 350/296 |
| 3,189,744 | 6/1965 | Ogland ............................... 350/21 X |
| 3,551,061 | 12/1970 | Glowa ................................. 356/241 |

*Primary Examiner*—Ronald L. Wibert
*Assistant Examiner*—Paul K. Godwin
*Attorney, Agent, or Firm*—John C. Wiessler

[57] ABSTRACT

A light reflective element which includes a truncated portion of a concave conical surface for receiving, redirecting and reflecting a collimated beam of light as an intense diverging plane of light having sharpest definition at the truncated or lower marginal edge thereof.

19 Claims, 9 Drawing Figures

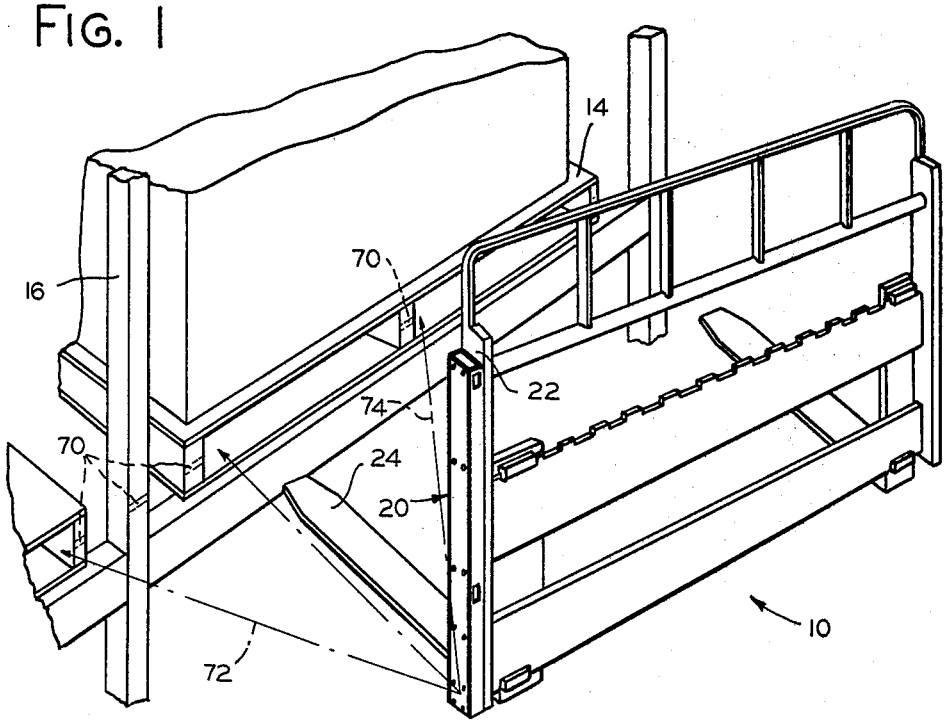
FIG. 1
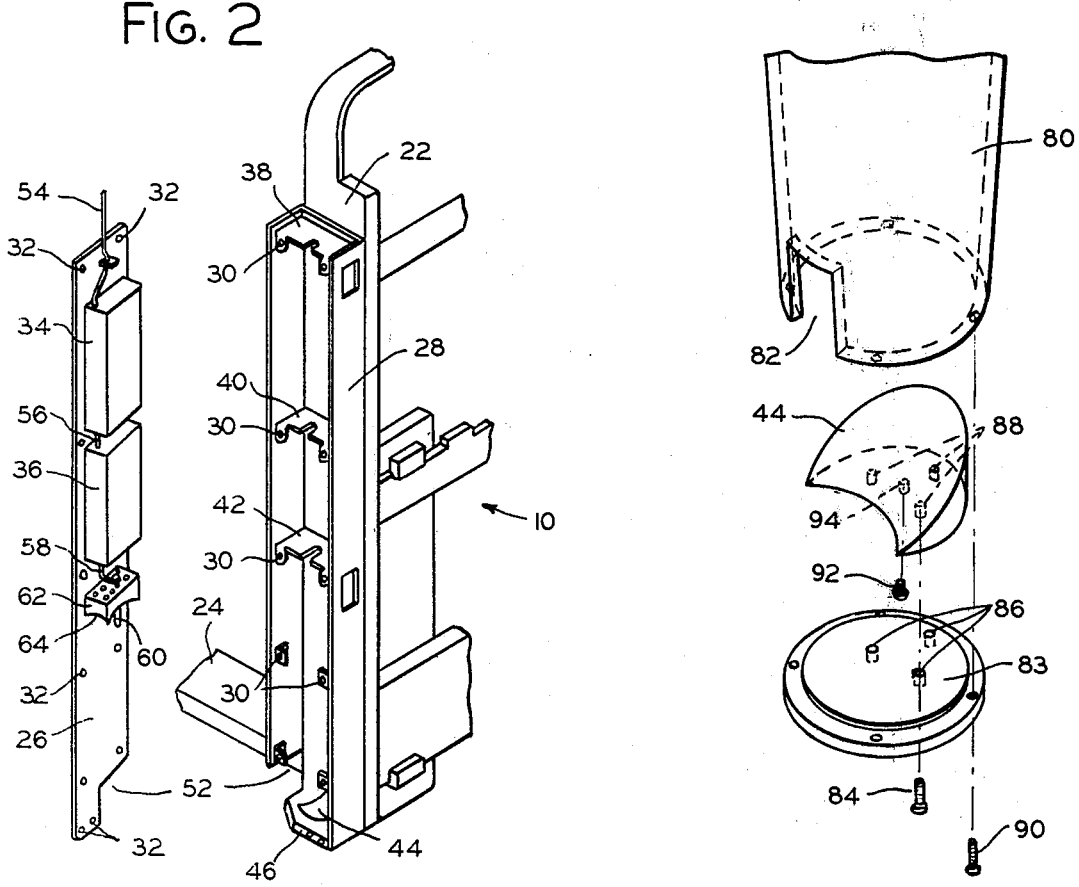
FIG. 2
FIG. 3

3,887,282

1

CONCAVE CONIC REFLECTOR

BACKGROUND OF THE INVENTION

The field of art to which the invention pertains includes vehicle and machine positional light reference devices, and more particularly a light reflective element for such devices.

In my copending application Ser. No. 441,683 filed Feb. 11, 1974 (a continuation application of application Ser. No. 288,607 filed Sept. 13, 1972 and now abandoned, which was a continuation-in-part application of application Ser. No. 84,708 filed Oct. 28, 1970, and also now abandoned), there is disclosed a number of embodiments of positional reference devices of the general type which comprises background relating to the present invention, which is an improvement of one of the components of such devices. Attention is therefore directed to said patent in respect of the discussion therein of the background of that invention, which also applies here, as well as to the prior art references cited in the patent and referred to in the text thereof.

SUMMARY OF THE INVENTION

My invention is an improvement of the conical reflective element utilized in certain embodiments of my above identified patent. It provides a light reflective element which includes a truncated portion of an "inside-out" or inverted concave conical light reflective surface which improves upon the convex conical light reflective element of my said copending patent in the projection of a diverging plane of light which when reflected from a selected object is perceived visually as a sharply demarcated and intense reflected line of light, the sharpest definition of which appears to an observer at the lower marginal edge of the line of light, thereby defining, for the operator of a lift truck, for example, the plane of the upper surfaces of the fork for locating precisely the fork in relation to the openings in a pallet, for example.

It is therefore the primary object of the invention to provide an improved reflector element in devices of the type contemplated.

BRIEF DESCRIPTION OF THE DRAWING

FIG. 1 is a somewhat schematized view of a fork carriage of a material handling vehicle, such as a lift truck, which embodies my invention, preparatory to entering a pallet which is located in an elevated position in a rack for material storage;

FIG. 2 is an enlarged perspective view of one corner portion of the fork carriage of FIG. 1 showing the internal structure of my light generating and projecting device which is located in the housing secured to the carriage;

FIG. 3 is an enlarged exploded view in perspective, broken away to show the lower portion of a modified hollow tubular housing for my device in relation to the inverted comic reflector, and which may be adapted to house the light generating device of FIG. 2;

DESCRIPTION OF THE PREFERRED EMBODIMENT

Figure 4:
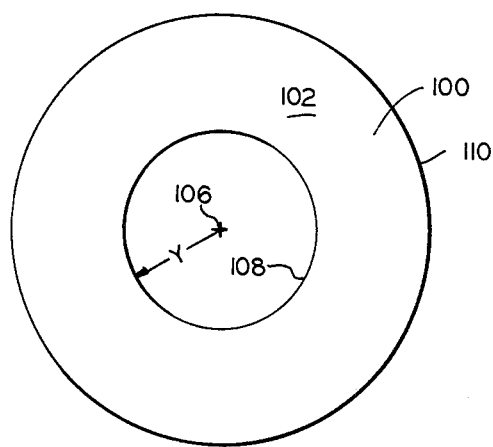
FIGS. 4 through 8 are projected views which show the manner of generating the inverted conic reflector element and which represent the manner by which light rays are received and reflected thereby.

FIG. 1 illustrates in somewhat schematized perspective view an elevated fork carriage 10 which is adapted to be transported and manipulated by a material handling vehicle, such as a fork truck, not shown, for engaging, transporting and depositing various types of loads in various locations. The illustrative embodiment in FIG. 1 shows the fork as it approaches the entry to a loaded pallet 14 which is located in an elevated bin of a storage rack structure 16.

The collimated light beam generating and reflecting assembly is shown generally at numeral 20. It is secured from at least the one side portion 22 of the fork carriage, as by welding, in a vertical position when the fork carriage is adjusted so that the fork tines 24 thereof are horizontal. Details of the assembly of unit 20 are illustrated in FIG. 2 in which a cover plate 26 is securable to a box section case assembly 28 which is mounted from the outer surface of the carriage side member 22. Threaded pairs of mounting brackets 30 are provided in which the cover plate may be secured through alignable pairs of openings 32, a solid state-power supply source 34 and a high voltage power supply 36 being sandwiched between pairs of mounting plates 38, 40 and 42, respectively, in case 28. The inverted concave conic reflector or element of my invention is shown at 44; it is secured to a bottom plate 46. Case 28 is a relatively thick walled metal box which is welded to one side of the fork carriage in the exemplary embodiment; the assembly is characterized by rugged, shock resistant long service-life construction for warehousing operations, and the like, in an industrial truck or other material handling vehicular or machine environment.

An aperture 52 of predetermined size is formed between the front and cover plates of case 28 when fully assembled. An input direct current power line 54 is adapted to be connected to the truck battery, or to an auxiliary battery, and connects to the power supply 34 which in turn is connected to a high voltage power supply 36 by a line 56 which is in turn connected by a line 58 to, preferably, a Xenon short arc lamp 60. Lamp 60 is secured to a mounting block 62 which houses a parabolic mirror 64 and preferably includes X, Y and Z axes screw adjustments, not shown, for locating the arc of the Xenon lamp at the exact focal point of the parabolic mirror for precise focusing for a purpose to be explained. The light source being essentially of pinpoint dimension in the case of the exemplary Xenon short arc lamp, such as approximtely .010 inch diameter, effects inherently in combination with the parabolic mirror without additional optical elements the collimated beam which is to be redirected and reflected by the inverted concave conic element 44. Suitable power supply and Xenon lamp components for such a system are manufactured by Pichel Industries, Inc., of Pasadena, California, and may operate on any one of a number of applied voltages.

As is well known, light from such a lamp 60 located at the precise focal point of the parabolic reflector 64 is reflected downwardly as an intense, collimated narrow pencil beam of light inside housing 28 to be projected onto the reflective inverted concave conical surface, such as any first or second surface reflector, of the conic section 44. The pencil beam of light when reflected from the inverted conic surface will, except for some slight dispersive effect, maintain a constant cross-sectional dimension 70 as it appears in FIG. 1, reflected as an interrupted line of light from the stringer members of the pallets and the one vertical support of the rack structure shown; i.e., the collimated, pencil beam of light becomes a diverging plane or fan of light which is collimated in one dimension in a manner to be described in detail below in conjunction with FIGS. 3–9. The angle between lines 72 and 74, which define the effective limits traversed by the fan of light, is determined by the diameter of the collimated beam of light, and the distance it is displaced from the vertical axis which passes through the projected apex of the inverted conical element 44. The effective transverse dimension of the aperture 52 may also be utilized to crop the fan of light to any predetermined angle. A sharply demarcated line of light formed as reflected from the fan shaped beam between limit lines 72 and 74 has an intensity which is sufficient to enable easy observance in brightly lighted warehouses, and the like. This indicates to the driver from the usual relatively difficult vantage point of his station, particularly during high lift deposit and pick up operations, that if the truck mast is vertical the fork which is in a horizontal position will be at the proper elevation for safe insertion into the pallet fork pockets as in FIG. 1. Similarly, the device functions to indicate to the driver the fork position for insertion into pallets and the like when executing a right turn into a storage rack area with the single left-hand mounted unit 20 as shown in view of the projected angle of the fan of light between lines 72 and 74 which preferably projects entirely across the fork tines. It has been found that the most precise reference in relation to fork truck operations, for example, is obtained if the rays of light at the lower extremity of the fan which focuses to form the bottom edge of light 70, are concurrent or aligned with the plane defined by the upper surfaces of the fork tines, and it is the primary particular object of this invention to provide improved definition at said bottom edge of the line of light by means of my inverted concave conic reflector.

Except for references above to the inverted concave conic reflector 44 the foregoing description and embodiment is included as one of the embodiments in my above said patent and does not form a part of the present invention except in combination with the inverted conic reflector to produce improved demarcation or definition at the bottom edge of the projected fan of light, as will now be described.

Figure 8:
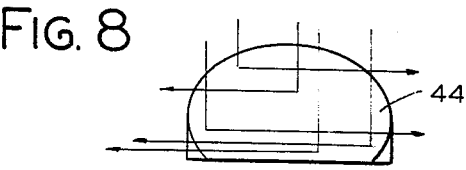

Referring now to FIG. 3, I have represented a preferred structural embodiment in the use of a tubular metal case member 80 which is adapted to be mounted from the fork carriage side plate 22 the same as in FIG. 8 of my said patent, having an aperture 82 at the lower end thereof through which the fan of light is projected. The inverted conical section 44 is adapted to be mounted on a bottom plate 83 by means of three triangularly related adjustment and securing screws 84 which extend through openings 86 into tapped openings 88 in the supporting body of the conic section 44, plate 83 being secured to the wall of tube 80 by a plurality of screws 90. A single and preferably resilient fulcrum 92 having a stem which extends into an opening 94 when assembled and an enlarged head portion, as shown, to support resiliently the reflector 44 from the bottom plate from the center point portion of the imaginary triangle. The fulcrum 92 has a configuration similar to a rivet. Circular support plates, not shown, may be secured suitably within the tube for mounting power supply elements connected to a Xenon lamp 60 and reflector 64 as in FIG. 2.

It will be noted that the conic section is supported on fulcrum 92 in spaced relation to plate 83, thereby providing an extremely simple, but effective, universal adjustment by means of screws 84 pivoting the conic section on the fulcrum in any direction. That is, the adjustment screws as related to each other and to the fulcrum 92 are capable of tilting the conic section either forwardly or rearwardly, to one side or the other, and in any plane therebetween, within the spatial limits inherent in a given design, in order to precisely align the reflected line of light with the bottom plane of the fork in the exemplary application of FIG. 1.

Figure 5:
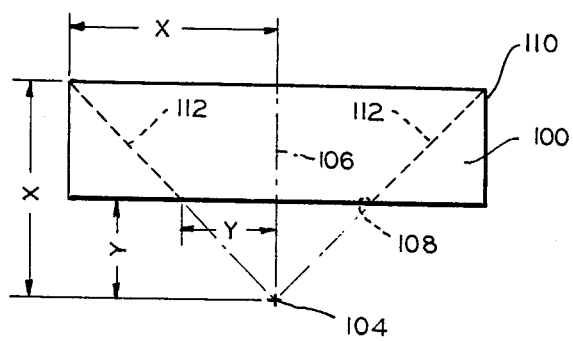

In FIGS. 4 and 5 there is represented geometrically a cyliner 100 in the interior of which has been formed an "inside-out" or inverted concave conical surface 102 which has a projected apex of revolution at 104 on a cone axis 106. As thus formed the configuration is seen in plan view as having a conical doughnut shape, the inside opening of which is represented by circle 108, the outside opening being represented by a circle 110, which two circles are connected by the inverted concave conical surface 102. The concave conical surface 102 is projected in FIG. 5 on the interior truncated cone at dotted lines 112. The horizontal radius $x$ is equal to the vertical distance $x$ which, as shown, provides for the formation of a 45° inverted conical surface, whereby vertical distance $y$, which represents the imaginary cut out portion of the cylinder cut back from the apex thereof, is equal to the radius $y$ as shown.

Figure 6:
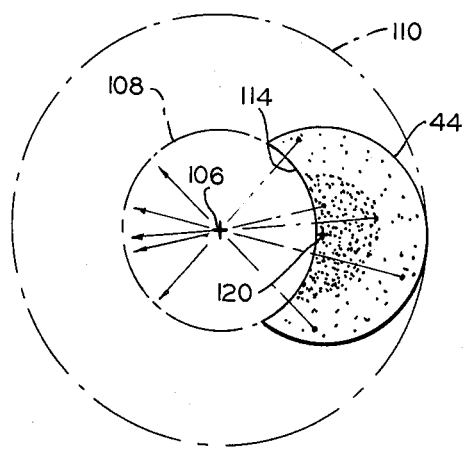
Figure 7:
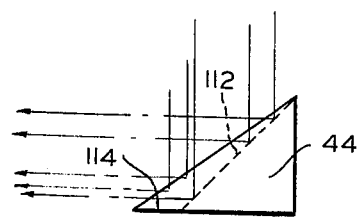
Figure 9:
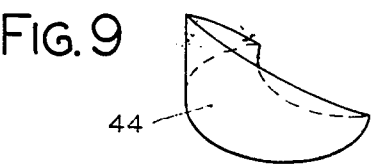
FIG. 9 is a perspective view taken from the rear quarter of the inverted conic reflector element.

In FIG. 6 there is reproduced in dotted and solid lines, as shown, the circles 108 and 110, on which is superimposed in solid lines the inverted concave truncated conical element 44 which appears as a crescent in plan view. In effect, it has been cut out of element 100 and has a projected shape as shown in FIGS. 7 and 8 and is viewed in perspective as shown in FIGS. 3 and 9. The inverted conical element 44 which is adapted to be mounted in tube 80 or box 20 is sometimes referred to herein as a "conical crescent." Of course, the dimensions $x$ and $y$ may vary to suit requirements and design options, but a 45° conical surface is preferred for right angle redirection of the light rays in the embodiment herein disclosed, wherein, as above noted in reference to FIG. 5, the dimensions $x$ will always be equal, as well as the dimensions $y$. If the radius $y$ varies from the height $y$ then the effect of the cropped or truncated portion represented by the circular sector 114 which forms the leading edge of the conical crescent will not direct the individual rays forming the light beam projected from lamp 60 through the projected apex point on cone axis 106 in the plane of surface 108.

FIG. 6 best represents in schematic form a pictorial approximation of the distribution of individual rays of light which comprise the collimated beam of light directed thereon, and the redirection through the cone axis 106 of exemplary individual rays which comprise said beam. Point 120 represents the optical axis of the reflector 44; i.e., the central axis of the collimated beam projected thereon by Xenon lamp 60 so that the greatest concentration of light surrounds the optical axis and is distributed radically outwardly therefrom in all directions, while decreasing in density of light rays per unit area as the radial distance from the optical axis increases. The dots in FIG. 6 represent rays of light, and the grouping of the dots exemplify an illustrative concentration of light which is far greater near the center of the light beam than near the outer portion of a cross-section thereof, it being assumed that the individual rays of light comprising the light beam are of equal intensity. It should be kept in mind, of course, that in a collimated pencil beam of light as is projected by lamp 60 all such rays remain substantially parallel one to another.

In design, the location of the optical axis 120 can be varied as desired, although I have found it to be preferable and most efficient to so locate the reflector that the said axis of the beam of light strikes the reflector centrally of and a small distance inwardly of the cropped edge 114. Thus, some tolerance is permitted in the adjustment of the components of a device such as in the embodiment above described, while assuring that a high density of rays of the beam will be reflected at the cropped edge 114, thereby assuring both very high intensity and discrimination or contrast of the bottom plane of light which projects as a bottom edge or line of reflected light, as described above.

The thickness of the reflected line of light and of the diverging plane of light will decrease in intensity and become somewhat "fuzzy" near the upper plane or edge thereof in the embodiment herein described, but will always project and reflect an intense and sharply demarcated line of light easily visible even in brightly lighted warehouses, and the like. Exemplary rays of light are shown reflected through the cone axis 106 in FIG. 6, regardless of the location at which the individual rays strike the conical crescent 44, said rays from the bottommost rays, which are reflected at edge 114, to the uppermost rays reflected from the outer circle of the conical crescent, determining the collimated thickness of the diverging plane and of the reflected line of light.

As will now be apparent, the importance of the cropping or truncating of the concave element to form the conical crescent, as at edge 114, assures the sharpest available demarcation or contrast at the lower edge of the reflected line of light by eliminating all of the beam of light which would otherwise have been reflected if the concave conical reflector 44 had been extended and enlarged to terminate, for example, at apex 104.

The use of a fan of sharply demarcated light collimated in one dimension and focused on infinity, or at some predetermined distance, and projected in a predetermined manner in relation to any vehicle or device in which the system is mounted and in relation to the object to be engaged or other referenced relationship, provides the driver significant advantages as discussed above. In thus improving the basis upon which an operator's judgment is exercised, this improvement and the results flowing therefrom reflect considerable advantages to be Although I have described and illustrated a preferred embodiment of my invention, it will be understood by those skilled in the art that mofications may be made in the structure, form, and relative arrangement of parts without necessarily departing from the spirit and scope of the invention. Accordingly, it should be understood that I intend to cover by the appended claims all such modifications which fall within the scope of my invention.

I claim:

1. In a collimated light generating device for referencing the position of load handling devices and the like, a light reflective element comprising a truncated portion of a substantially concave conical light reflective surface, said light reflective surface being adapted to redirect the rays of light of a substantially collimated beam which are directed onto the reflective surface from a predetermined location into a diverging plane of light substantially collimated in one dimension and adapted to appear as an intense line of light on an adjacent surface.

2. A device as claimed in claim 1 wherein said light reflective surface is truncated in such a manner that the most intense surface of light of the projected diverging plane of light is the bottom surface thereof.

3. A device as claimed in claim 1 wherein the truncated portion of the light reflective surface is an arc forming a leading edge of the reflective surface.

4. A device as claimed in claim 3 wherein said arc is a circular sector.

5. A device as claimed in claim 1 wherein the truncated portion of the light reflective portion is an arc forming a leading edge of the reflective surface, and the axis of said collimated beam of light is located inwardly of said arc.

6. A device as claimed in claim 1 wherein said light reflective surface comprises a portion of a substantially concave 45° cone, the vertical axis of which is located centrally forwardly of the light reflective surface, the rays of light of said collimated beam being reflected by the light reflective surface to intersect substantially at said axis and to form beyond said axis said diverging plane of light.

7. A device as claimed in claim 1 wherein said light reflective surface in one projected view is of a generally crescent shape.

8. In a collimated light generating device for referencing the position of load handling devices and the like, a light reflective element comprising a truncated portion of a substantially concave conical light reflective surface, said light reflective element being supported on a fulcrum and adapted to be mounted on triangularly related adjustment means for tilting the element on the fulcrum.

9. A device as claimed in claim 1 wherein said light reflective element is supported on a fulcrum and is adapted to be mounted on adjustment means for tilting the element on the fulcrum in any one of a plurality of selected directions to adjust the position of the line of light on said adjacent surface.

10. A device as claimed in claim 1 wherein the collimated beam is substantially parallel to the cone axis of the reflective surface.

11. A device as claimed in claim 2 wherein the axis of the collimated beam is substantially parallel to the cone axis of the reflective surface and is adjacent the truncated edge thereof.

12. A device as claimed in claim 5 wherein said collimated beam axis is located adjacent the truncated edge of said reflective surface.

13. A device as claimed in claim 1 wherein the truncated portion of the light reflective surface is an arc forming a leading edge of the reflective surface, and said collimated beam strikes said surface adjacent said arc.

14. In a vehicle having a manipulatable load handling device, a light optical means mounted on the handling device being so constructed and arranged as to provide a substantially collimated light beam and to project said light beam from said load handling device as a diverging plane of light collimated in one dimension and in a predetermined attitude in relation to the load handling device such that a visual reference of the position of the load handling device appears in the form of a distinctly perceivable line of light on surfaces in the path of the projected diverging plane of light, said light optical means including a light reflective element having a truncated portion of a substantially concave conical light reflective surface.

15. A device as claimed in claim 14 wherein said truncated portion forms a concave arcuate edge of the reflective surface.

16. A device as claimed in claim 15 wherein said collimated light beam strikes said surface at a location adjacent said edge.

17. A device as claimed in claim 14 wherein said light reflective element is supported on a fulcrum and is adapted to be mounted on triangularly related adjustment means for tilting the element on the fulcrum.

18. A device as claimed in claim 15 wherein said light reflective surface comprises a portion of a substantially concave 45° cone, the vertical axis of which is located centrally forwardly of said arcuate edge, the axis of the collimated light beam being substantially parallel to said cone axis.

19. A device as claimed in claim 10 wherein said concave conical surface is a portion of substantially concave 45° cone.

* * * * *